Oct. 24, 1950 — L. L. BRUSO — 2,526,930
LOG STAKE RELEASER
Filed Aug. 4, 1949 — 2 Sheets-Sheet 1
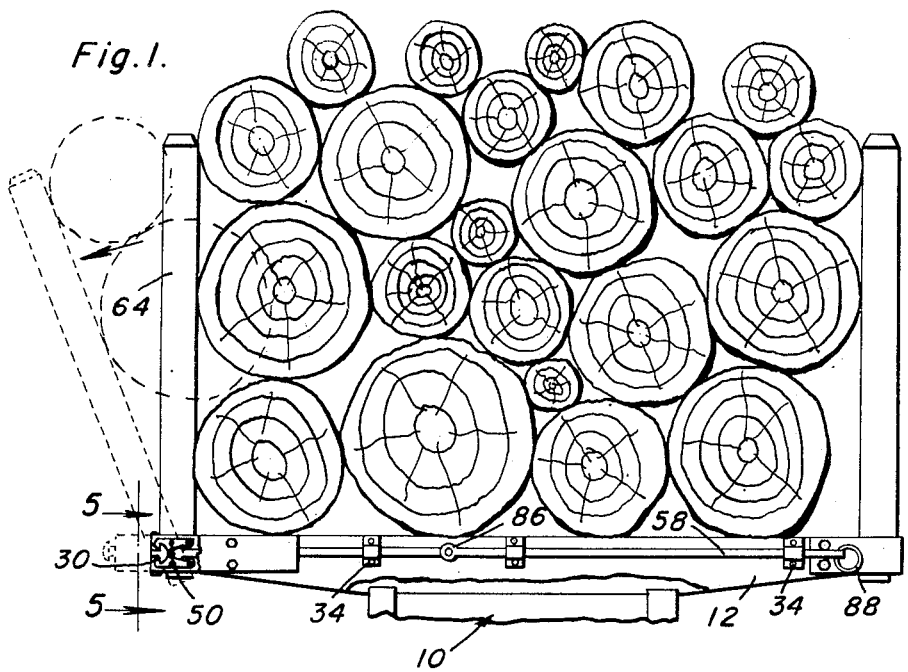
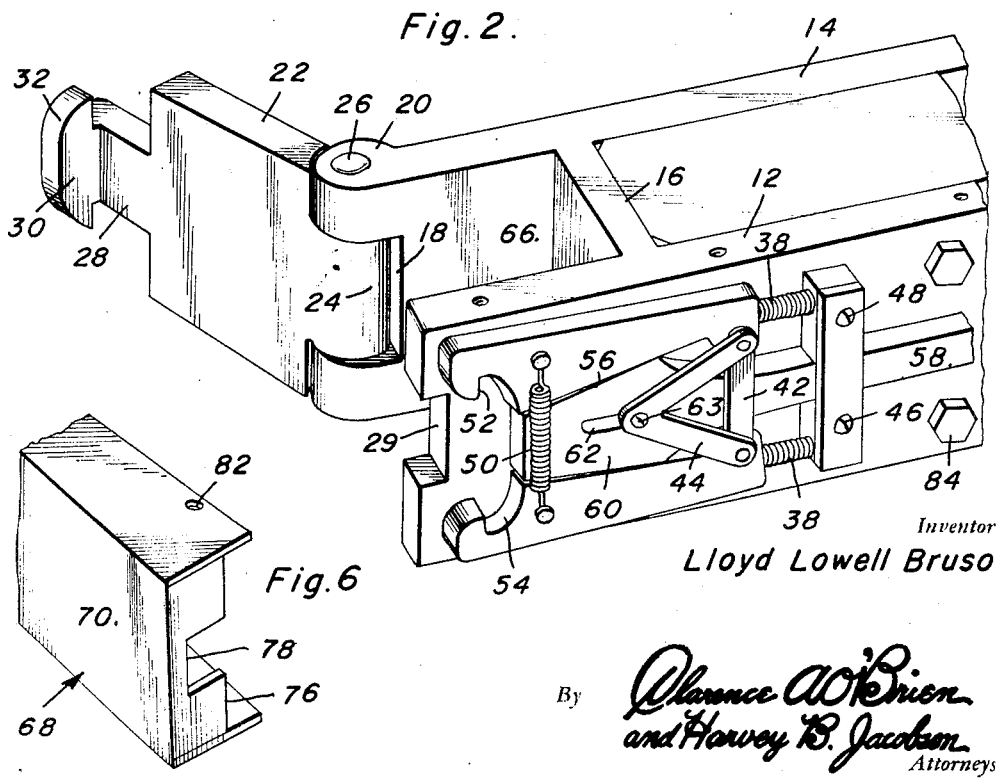
Inventor
Lloyd Lowell Bruso
By Clarence A. O'Brien and Harvey B. Jacobson
Attorneys Oct. 24, 1950
L. L. BRUSO
2,526,930
LOG STAKE RELEASER
Filed Aug. 4, 1949
2 Sheets-Sheet 2
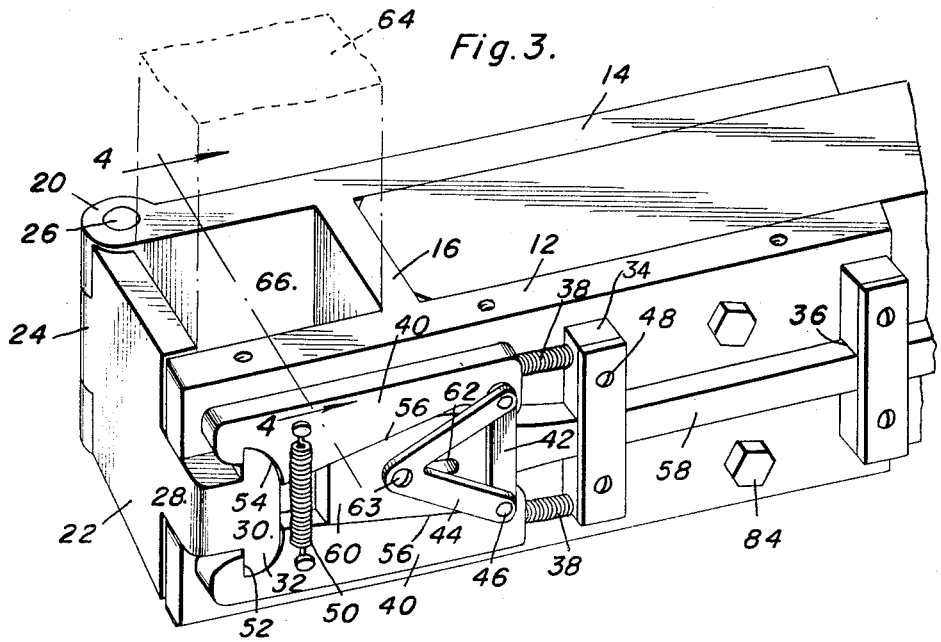
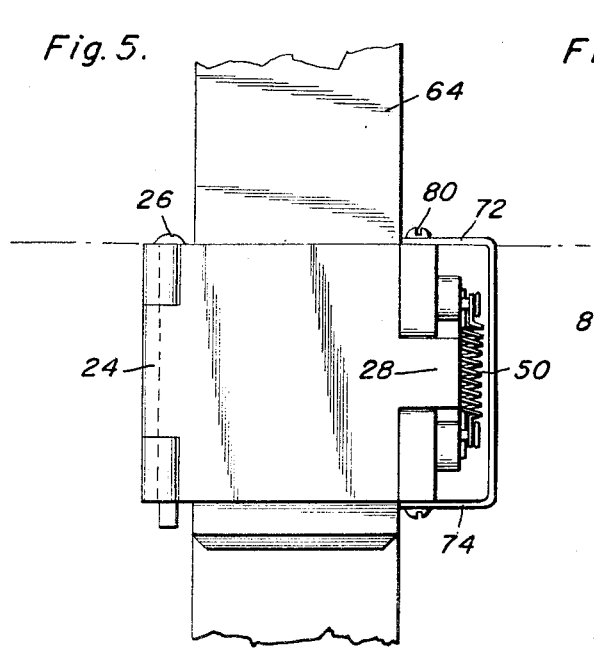
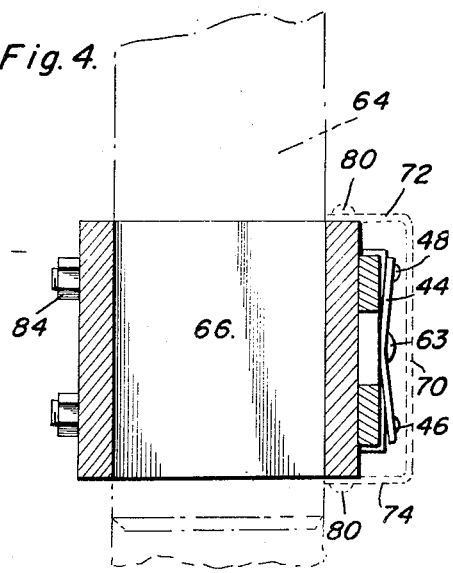
Inventor
Lloyd Lowell Bruso
By Clarence A. O'Brien
and Harvey B. Jacobson
Attorneys Patented Oct. 24, 1950

2,526,930

UNITED STATES PATENT OFFICE 2,526,930

LOG STAKE RELEASER

Lloyd Lowell Bruso, Springfield, Vt.

Application August 4, 1949, Serial No. 108,542

4 Claims. (Cl. 280—147)

This invention relates to new and useful improvements in vehicle unloading apparatus such as are employed on trucks engaged in the hauling of logs and the like.

The principal object of the present invention is to provide control means to hold a stake in a positive manner when in use, and which will readily release the stake when a cargo is to be discharged.

Another important object of the invention is to provide a control means which will be of simple construction and substantially foolproof in operation.

A further object of this invention relates to control means for discharging cargo on one side of a truck, while the operator actuates the control means while on the other side of the truck thus being protected from possible injury from the falling logs.

These, together with various ancillary objects of the invention which will later become apparent as the following description proceeds, are attained by this device, the preferred embodiment of which has been illustrated by way of example only in the accompanying drawings, wherein:

Figure 1 is a rear elevational view of the preferred embodiment of this invention, parts being broken away to show the location of mechanisms under cover;

Figure 2 is a perspective view showing the operating mechanism in open position;

Figure 3 is another perspective view showing the operating mechanism in closed position;

Figure 4 is a vertical sectional view taken along line 4—4 in Figure 3;

Figure 5 is another vertical sectional view taken along line 5—5 in Figure 1; and Figure 6 is a perspective end view of a cover plate used to cover the mechanism of the present invention.

Referring now more particularly to the accompanying drawings wherein like numerals designate similar parts throughout the various views, attention is directed first to Figures 1, 2 and 3 wherein the principles of the present invention are most clearly shown in their preferred embodiment. Reference numeral 10 generally denotes a supporting bed of a truck or other vehicle. On said bed 10, a pair of parallel cross members 12 and 14 are positioned. Spacing said cross members and rigidly securing them together are webs 16. One end of the cross member 14 adjacent a web 16 is provided with a recess 18. The unrecessed portions of the member 14 are rounded off as at 20 to the shape of a female hinge portion. A gate member 22 having an end shaped as a male hinge portion 24 is pivotally secured to said member 14 by a hinge pin 26.

The gate 22 is provided with a mid portion of equal height as the cross members and has a substantially smaller neck portion 28 at its other end adapted to engage with a recess 29 in cross member 12. At right angles to the neck portion 28 is an interlocking portion 30 adapted to lie parallel alongside and substantially flush with cross member 12. This interlocking portion includes a substantially semi-circular interlocking surface 32 having a diameter of greater height than said neck portion 28; the portion of greatest height of said interlocking portion being next adjacent the neck portion.

Rigidly attached to the cross member 12 by screws or the like are brackets 34. The brackets 34 have a recess 36 centrally therein for a purpose to be later described. The bracket 34 most nearly adjacent the recessed end 29 of member 12 has a pair of coil springs 38 attached thereto lying longitudinally of the member 12 and in the direction of the recessed end. The other ends of the springs 38 are attached to a pair of jaw members 40 pivotally attached to each other by means of cross bar 42 and the V-shaped bar 44 and by pins 46 and 48. A coil spring 50 is terminally secured transverse to the jaws 40 and across the opening between them. The jaws 40 are provided with shoulders 52 and arcuate portions 54 in which the interlocking portion 30 may be encompassed as best shown in Figure 3. Sloping away from said arcuate portions 54 are sloping portions 56.

A pressure rod 58 is slidably emplaced within the recesses 36 in the brackets 34. This pressure rod 58 is provided with a wedge shaped head portion 60 adapted to engage the sloping portions 56 of the jaws 40. The wedge 60 is provided with a slot 62. A pin 63 is rigidly secured to the V bar 44 and engages said wedge 60 within the slot 62. Stakes 64 are adapted to be positioned in the enclosure 66 formed by members 12 and 14, gate 22, and web 16.

Referring now more particularly to Figures 4 through 6, reference numeral 68 denotes a cover. This cover 68 is provided with a front wall 70, a top wall 72, a bottom wall 74, and an end wall 76 having a recess 78 therein. The cover 68 is secured over the working mechanism including jaws 40 by means of screws 80 extending through apertures 82 in the top and bottom walls 72 and 74 respectively. Additional securing means are bolts 84 which are provided for securing the mechanism to a suitable vehicle.

The pressure rod 58 is preferably made in sections hinged together as at 86 and is provided with a ring 88 at the end opposite from the wedge 60.

Operation of the device is as follows:

With a stake 64 inserted within enclosure 66 and logs loaded upon the truck and resting against the stake 64, the gate 22 being in a shut position as is shown in Figure 3, the pressure rod 58 is then struck a blow at its ring end thus driving the wedge 60 against the sloping portion 56 and opening the jaws 40. This will release the gate 22 and the stake 64 will subsequently fall due to its own now unsupported weight and the weight of the logs thus allowing the major portion of the logs to roll off the truck.

Subsequently the pressure rod 58 may be withdrawn by pulling on the ring 88 and the gate may be closed by having the interlock 30 snapped into engagement with shoulders 52 of the jaws 40. Then the stake 64 may be replaced within the recess 66 and the truck is then ready to be reloaded.

The cover 68 plays an important part in keeping the elements away from the working mechanism and thus keeping these parts clean and unharmed.

The spring member 50 maintains the jaws in clamping relationship at all times, and the spring members 38 allow for small longitudinal displacement of the jaws 40. Thus these springs 38 and 50 take up shocks encountered during a trip by the truck and aid in the prevention of unexpected dumping of the truck. Therefore, this mechanism is substantially foolproof and since the operator actuates the mechanism from the ring end by decisively hitting the pressure rod, mere unforseen engagement of the ring with a passing branch or the like will not actuate the mechanism.

Since from the foregoing the construction and advantages of the device may be readily understood, further explanation is believed to be unnecessary.

However, since numerous modifications will readily occur to those skilled in the art after a consideration of the foregoing specification and accompanying drawings, it is not intended to limit the invention to the exact construction shown and described, but all suitable modifications and equivalents may be resorted to which fall within the scope of the appended claims.

Having described the invention, what is claimed as new is:

1. An unloading apparatus for a log carrying vehicle comprising a pair of parallel cross members fitted on said vehicle in spaced relationship, a first of said cross-members having a gate pivotally secured thereto, securing means on the second of said cross members for releasably securing said gate thereto, a stake releasably positioned within said cross members and adjacent said gate, said gate including an interlocking member at substantially right angles thereto, releasing means on said second cross member for releasing said gate member and said stake, said securing means comprising a pair of jaw members, resilient means holding said jaw members in clamping relationship over said interlocking member, said resilient means including a coil spring transverse said jaw members and having its ends terminally attached to each of said jaw members, a bracket secured to a cross member and having a recess therein, spring means secured at one end to said bracket, the other end of said spring means being secured to said jaw members.

2. The apparatus of claim 1 wherein said spring means include a pair of coil springs, said coil springs being positioned longitudinally of said cross members.

3. The apparatus of claim 2 including a pressure rod slidably secured within said recess on said bracket and within said jaws.

4. The apparatus of claim 3 including means for moving said pressure rod longitudinally within said jaws thereby selectively engaging and releasing said interlocking member of said gate.

LLOYD LOWELL BRUSO.

REFERENCES CITED

The following references are of record in the file of this patent:

UNITED STATES PATENTS

| Number | Name | Date |
|---|---|---|
| 792,742 | Tew et al. | June 20, 1905 |
| 1,047,291 | Reeves | Dec. 17, 1912 |
| 2,477,202 | Puxon | July 26, 1949 |